(12) United States Patent
Tilley

(10) Patent No.: US 7,702,507 B2
(45) Date of Patent: Apr. 20, 2010

(54) VOICE ACTIVATED RAPID DEPLOYMENT FOR MOBILE COMPUTERS

(75) Inventor: Patrick Tilley, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 207 days.

(21) Appl. No.: 11/271,589

(22) Filed: Nov. 10, 2005

(65) Prior Publication Data
US 2007/0112767 A1 May 17, 2007

(51) Int. Cl.
*G10L 15/14* (2006.01)
(52) U.S. Cl. ............... 704/256; 704/270.1; 704/273
(58) Field of Classification Search .............. 704/250, 704/255, 270, 275, 273, 246, 231, 270.1, 704/256, 272, 274, 3; 709/219, 220, 221
See application file for complete search history.

(56) References Cited

U.S. PATENT DOCUMENTS

| | | | |
|---|---|---|---|
| 5,758,071 A | 5/1998 | Burgess et al. | |
| 5,926,463 A | 7/1999 | Ahearn et al. | |
| 6,012,088 A * | 1/2000 | Li et al. | 709/219 |
| 6,542,928 B1 | 4/2003 | Hammons | |
| 6,738,743 B2 * | 5/2004 | Sharma et al. | 704/270.1 |
| 7,181,400 B2 * | 2/2007 | Cohen et al. | 704/275 |
| 7,228,277 B2 * | 6/2007 | Nagashima | 704/250 |
| 7,266,594 B2 * | 9/2007 | Kumbalimutt et al. | 709/221 |

FOREIGN PATENT DOCUMENTS

WO    WO2007/061500    5/2007

OTHER PUBLICATIONS

International Search Report dated Sep. 24, 2007 for PCT Application Serial No. PCT/US06/37352, 3 Pages.
International Preliminary Report on Patentability mailed May 22, 2008 in related case PCT/US2006/037352.

* cited by examiner

*Primary Examiner*—Huyen X. Vo

(57) ABSTRACT

Systems and methods that automatically register a mobile computing unit on a wireless network area, via employing a voice recognition system associated with the mobile computing unit. A handshake can occur between a mobile computing unit and a server of the network upon utterance of predetermined voice (e.g., a sequence of letters) by the user into the voice recognition component. As such, a mass deployment of mobile computing units on the network can be facilitated in a secure manner with just enough information to access the network.

22 Claims, 9 Drawing Sheets

VOICE ACTIVATED RAPID DEPLOYMENT FOR MOBILE COMPUTERS

BACKGROUND

With the recent increase in network computing applications, wireless information transfer, and internet applications, the number of applications for which data processing systems are employed has increased correspondingly. Mobile computing units such as personal digital assistants (PDA), notebook and laptop personal computers (PCs) have become increasingly popular due to their portability and increased functionality.

Many of such mobile computing units are handheld devices, or palm-size devices, which comfortably fit within, or can be carried by one hand. For example, one commercially available mobile device is sold under the trade name HandHeld PC (or H/PC). Such units are generally assembled by enclosing internal electrical components, such as a central processing unit (CPU) board, display, keyboard, and internal wiring, within a housing made of plastic or another structural material. A communication interface is also provided and is commonly used to communicate with an associated network.

Among the most prevalent of network connection types is a wireless network, typically implemented using an IEEE 802.11x protocol, sometimes referred to as WiFi. However, in order for these devices to be able to access and communicate over the wireless network, the devices usually have to be pre-configured with a variety of network access parameters including a network identifier and a network key, among others.

The need to pre-configure devices with network access parameters presents at least two problems. First, a method or methods for configuring network access parameters frequently varies from device to device. Second, each device usually has to be individually configured so that the task of configuring a large number of devices can be prohibitively time-consuming. The magnitude of both these problems is compounded in cases when a network administrator needs to configure devices to access more than one wireless network. In some cases, a device may be incapable of being configured to access more than one wireless network.

Additionally, errors in device configuration can cause problems in running applications in one or more computers within the network system. At the same time, applications which are run by users typically do not include sophisticated methods for identifying and correcting network related errors. In particular, because inadvertent erroneous configurations are typically not identified for the application by the network, no corrective action can be taken. This results in confusion and frustration for consumers, who must then call support professionals to help solve their application problems. Moreover, although users may save static configuration settings for each network and subsequently apply them manually, manual processes are both error prone and time consuming.

Therefore, there is a need to overcome the aforementioned exemplary deficiencies associated with conventional devices.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation provides for systems and methods of automatically configuring (e.g., registering) a mobile computing unit on a wireless network area, via employing a voice recognition system and a configuration component associated with the mobile computing unit. A handshake can occur between the mobile computing unit and a server of the network upon utterance of predetermined voice (e.g., a sequence of letters) by the user into the voice recognition component, to configure the device via the configuration component. As such, a mass deployment of mobile computing units on the network can be facilitated in a secure manner with just enough information to access the network.

In a related aspect, encrypted parameters employed for a network configuration of the mobile computing unit can be activated in response to a user uttering a sequence of words therein. Subsequently and upon connecting to the network, other biometric indicia can be employed to verify the user's identity and/or grant permission to employ other network capabilities. As such, a secure mechanism can be provided for a quick deployment of a plurality of mobile computing units.

According to a further aspect, the server(s) associated with the network can rapidly and remotely define policies and enforce those policies when the user of the mobile computing device utters predetermined voices therein, and upon connection of such mobile computing device to the network, and/or request for a synchronization. A hand shake can take place between the mobile device(s) and the server every time that a new policy occurs, or any time a synchronization is requested therebetween. Such policy delivery and enforcement logic can verify proper installation of server policies in a timely manner, and non-compliant devices that do not provide proper voice activated codes are denied service from the server.

In a related methodology in accordance with an aspect of the subject innovation, a plurality of mobile computing devices with voice recognition components are supplied for connection to a network. Such mobile computing units are then powered up and distributed among a plurality of users. Each user then can then utter a predetermined voice or sequence of words to establish connection with the network. The server(s) associated with the network can then send down all settings (e.g., at once) to the mobile computing unit(s). Next, the mobile computing unit(s) can send an acknowledgement that indicates that all policies required by the server have been implemented, and at that point the server can permit employment of the network and/or synchronization to occur. Such an arrangement typically supplies flexibility to the server (e.g., to impose arbitrary policies on the mobile device), and provides for a rapid deployment of the mobile computing units.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
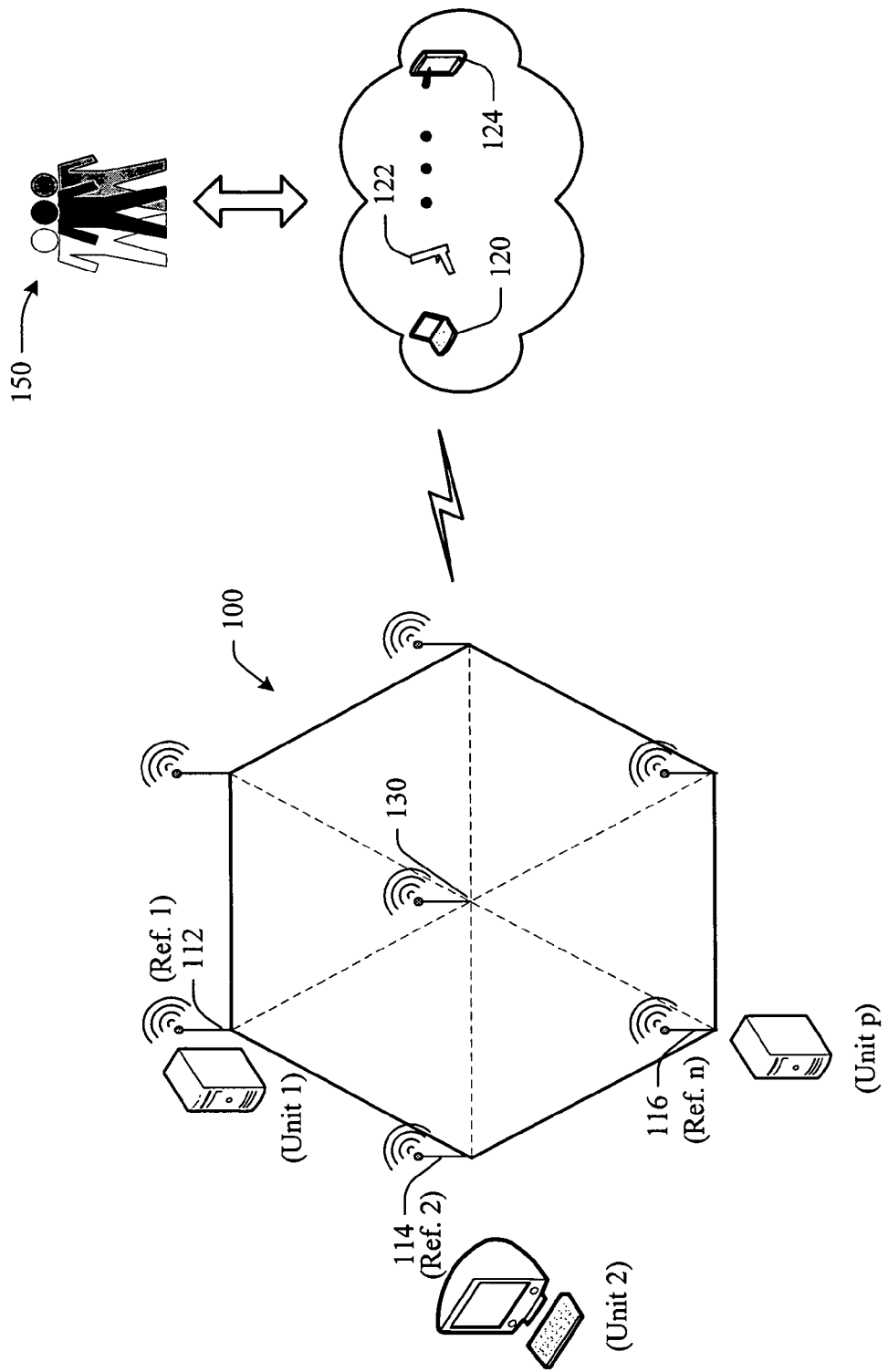
FIG. 1 illustrates a layout and schematic block diagram of mobile computing units that require connection to a networked area as defined by a plurality of reference points.

The subject innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the subject innovation can be practiced without these specific details. In other instances, well-known structures and devices are shown in block diagram form in order to facilitate describing the subject innovation.

As used in this application, the terms "component," "handler," "model," "system," and the like, in addition to electromechanical entities, are also intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

Referring initially to FIG. 1, there is illustrated a plurality of mobile computing units 1 thru p (where p is an integer) 120-124 each having a voice recognition component to facilitate connection to a system area network 100 or other type of network in accordance with an aspect of the subject innovation.

The network system 100 can be a system area network or other type of network, and can be defined via a series of reference points 112, 114, 116 (reference points 1 to n, where n is an integer). Each reference point can be associated with and/or designated as a station associated with a server and/or mobile computing unit 120, 122, 124 (1 to m, where m is an integer) with transmitting/receiving capabilities. Such computing units 120, 122, 124 can include a speech recognition component, as described in detail infra. Upon utterance of predetermined voice (e.g., a sequence of letters) by the user into the voice recognition component, a handshake can occur between a mobile computing unit 120, 122, 124 and a server of the network (e.g., server 112). As such, a mass deployment of mobile computing units on the network 100 and between users 150 can be facilitated in a secure manner with just enough information to access the network. Such reference points 112, 114, 116 can also be in communication with additional sub-reference points (e.g., node 130) to further delineate the layout 100 in a triangular fashion for higher resolution.

The network system 100 can further include additional hosts (not shown), which may be personal computers, servers or other types of computers. Such hosts generally can be capable of running or executing one or more application-level (or user-level) programs, as well as initiating an I/O request (e.g., I/O reads or writes). In addition, the network system 100 can further include one or more input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters. Mobile computing units 120, 122, 124 can be scattered though out the network system 100, with an initial configuration on the network being established via employing a voice recognition component as described in more detail infra. It is to be appreciated that the network system 100 can employ various standards to protect link-layer communications from eavesdropping and other attacks. For example, such protection can include Wired Equivalency Privacy (WEP) protocol, Wi-Fi Protected Access (WPA) and the like.

Figure 2:
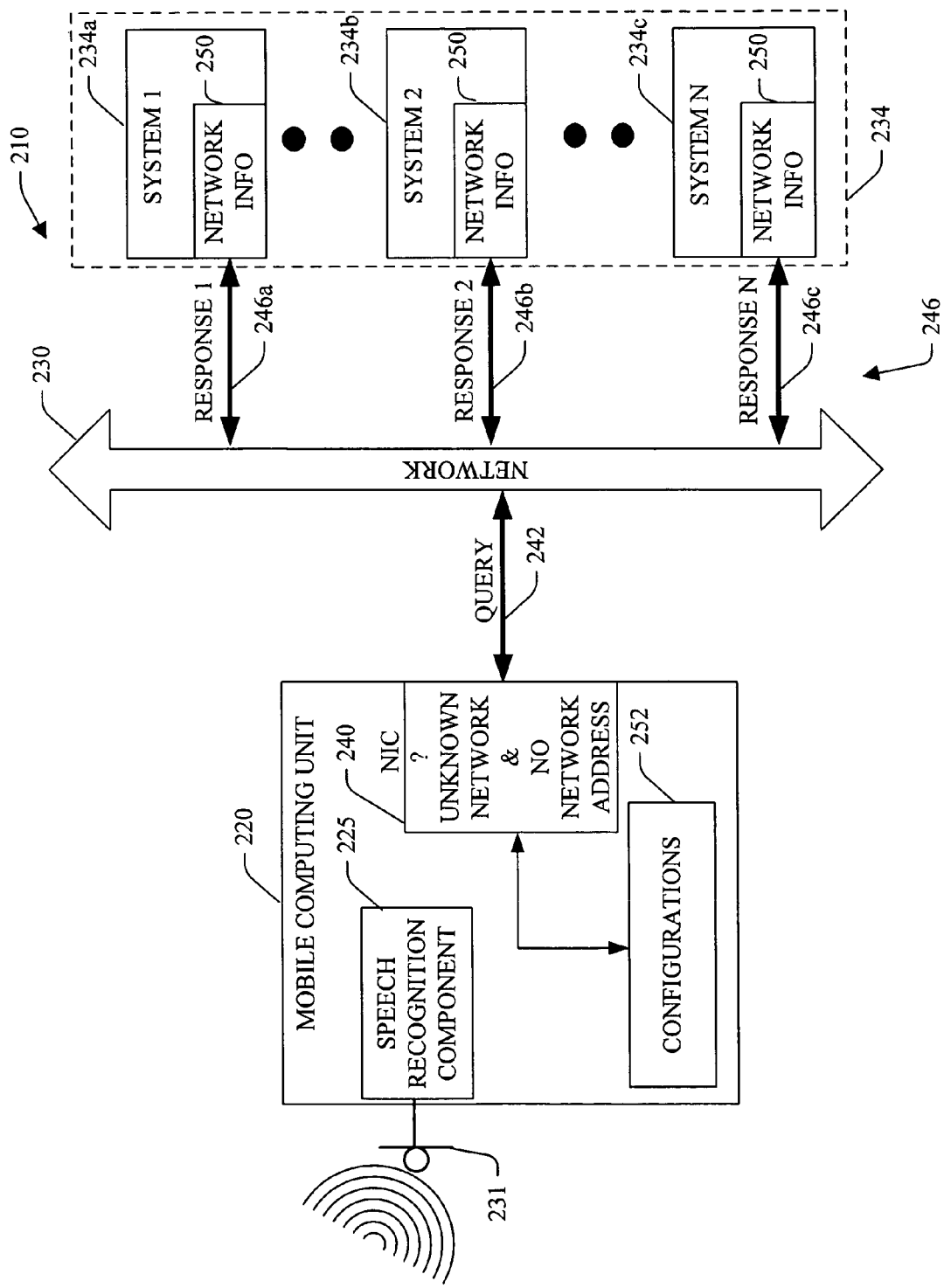
FIG. 2 illustrates a particular aspect of the subject innovation related to configuration and attachment of mobile computing units to a network.

Referring now to FIG. 2, a system 210 illustrates a particular aspect of the subject innovation related to configuration of mobile computing units attachable to a network(s). A mobile computing unit 220 with a speech recognition component 225 is shown operatively coupled to an exemplary network 230 with a plurality of network systems 234a through 234c, hereinafter referred to as network system 234, coupled thereto. Upon utterance of a predetermined voice into a microphone 231, and connection to the network 230 and before a network configuration may be established, the mobile computing unit 220 may direct a configuration component such as a Network Interface Card (NIC) 240, for example, to communicate via the network 230. Initially, the mobile computing unit 220 is without a network address and as with conventional systems, would be unaware of the particular network 230 attachable thereto.

In accordance with an exemplary aspect of the subject innovation, even though the NIC 420 has not been given a network address and configured to communicate with the network 230, a query 242 may be directed to the network 230 in order to determine a suitable network configuration 252. After sending the query 242, the mobile computing unit 220 can listen for a response from the network systems 234 that are adapted to provide a response 246a through 246c, hereinafter referred to as responses 246. The responses 246 can include network information 250 and can be directed to the source of the query 242—in this case, for example, the mobile computing unit 220.

As will be described in more detail below, the responses 246 can be provided as a result of the network system 234 receiving a multicast and/or broadcast address in which to respond. According to another aspect of the subject innovation, the response can alternatively be sent to a standard multicast address, wherein units configured according to the subject innovation respond to. For example, the multicast address can be the same as the address to which the request was sent to.

If a response 246 is received by the mobile computing unit 220, a determination can be made, based upon the network information 250, as to the appropriate configuration for the NIC 240. For example, the mobile computing unit 220 can have previously stored at least one network configuration 252. The mobile computing unit 220 can then interpret the network information 250 and determine whether the network configuration 252 correlates therewith. If the stored configuration 252 correlates with the network information 250, then the configuration 252 can be applied to the NIC 240. It is noted that the responses 246, which are shown as response 1 through response N (N being an integer), can be staggered wherein each system 234a through 234c provides network information 250 at suitable points in time such that network 230 communications are minimally affected and such that network bandwidth is conserved. This may be achieved, for example, in a manner wherein when one network system responds, other systems listening to the response will not respond. Redundant responses are therefore advantageously mitigated.

It is noted that other mobile computing units that attempt to determine their network configuration can determine the configuration from the response 246 that was multicast and/or broadcast as a result of the query 242 from the mobile computing unit 220. Accordingly, other mobile computing units (not shown) attachable to the network 230 can begin listening for responses. Additionally, a router (not shown) on the network, can transmit such network configuration information periodically, wherein mobile computing units can learn their network configurations from the periodic transmissions.

The mobile computing unit 220 can have a plurality of possible configurations 252 for the NIC 240 and/or other network cards (not shown) that can reside thereon. A configuration 252 may exist for each network 230 and NIC 240 that has been configured over time, for example. The configurations 252 can be determined from previous network operations and/or provided statically from a system administrator or initially encrypted for a later activation in response to a user uttering a sequence of words and saved in some persistent storage (not shown) on the mobile computing unit 220. In a static configuration 252 for example, the configurations can be input and/or downloaded manually, wherein it remains essentially static (unless manually removed) and is activated upon a predetermined utterance. Such can include for example, an Internet Protocol (IP) address, a subnet address—an address of a sub-network for which the IP address is valid, a subnet mask—a bit pattern that when applied to an IP address yields the subnet address, and a name server address.

In a dynamic configuration 252, the configuration 252 can be acquired from a Dynamic Host Configuration Protocol (DHCP) server and/or Bootstrap Protocol (BOOTP) server (not shown) employing DHCP protocol. A dynamic configuration can have a designated lifetime known as the lease time. Network configurations 252 acquired via DHCP or BOOTP can change on lease expiration or when the mobile computing unit 220 moves to another network and thus receives a new configuration from a DHCP or BOOTP server on the new network. It is noted that the subject innovation can provide automatic configuration of previously stored static and/or dynamic configurations when no DHCP or BOOTP server is available. If the mobile computing unit 220 connects to a system having a DHCP and/or BOOTP, network configurations can be alternatively received from the DHCP or BOOTP.

Figure 3:
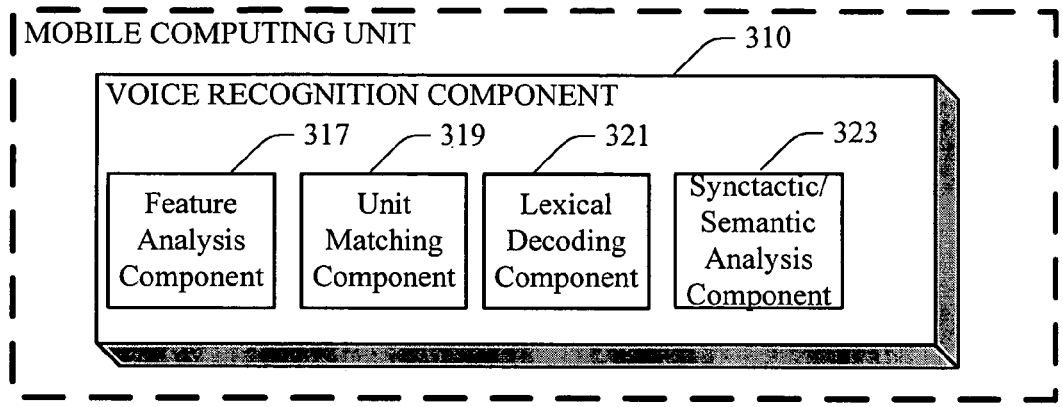
FIG. 3 illustrates a mobile computing device with a voice recognition component in accordance with an aspect of the subject innovation.

FIG. 3 illustrates a mobile computing device 300 with a voice recognition component 310 in accordance with an aspect of the subject innovation. The voice recognition component 310 can apply models such as Markov models, Dynamic Time Warping (DTW) and neural-net microprocessors, and the like to recognition of speech. In general, Markov models can be based on a mathematical structure that forms the theoretical basis for a wide range of applications. When Markov models are applied to speech recognition, the models are referred to as the Hidden Markov Models (HMM) to include the case where the observation is a probabilistic function of the state. Such Hidden Markov Models employed in speech recognition are characterized by a process that provides evaluation of the probability or likelihood of a sequence of speech sounds. Typically, a speech recognition component 310 that employs HMM can include a feature analysis component 317 that provides observation vectors used for training the HMMs that characterize various speech sounds. A unit-matching component 319 can provide the likelihood of a match of all sequences of speech recognition units to an unknown input speech sound.

Moreover, a lexical decoding component 321 can place constraints on the unit-matching component 319 so that the paths investigated are those corresponding to sequences of speech sounds that are in a word dictionary or other predetermined word listing, for example. Syntactic and semantic analysis component 323 can further constrain the paths investigated to provide higher performance of the speech recognition system.

Figure 4:
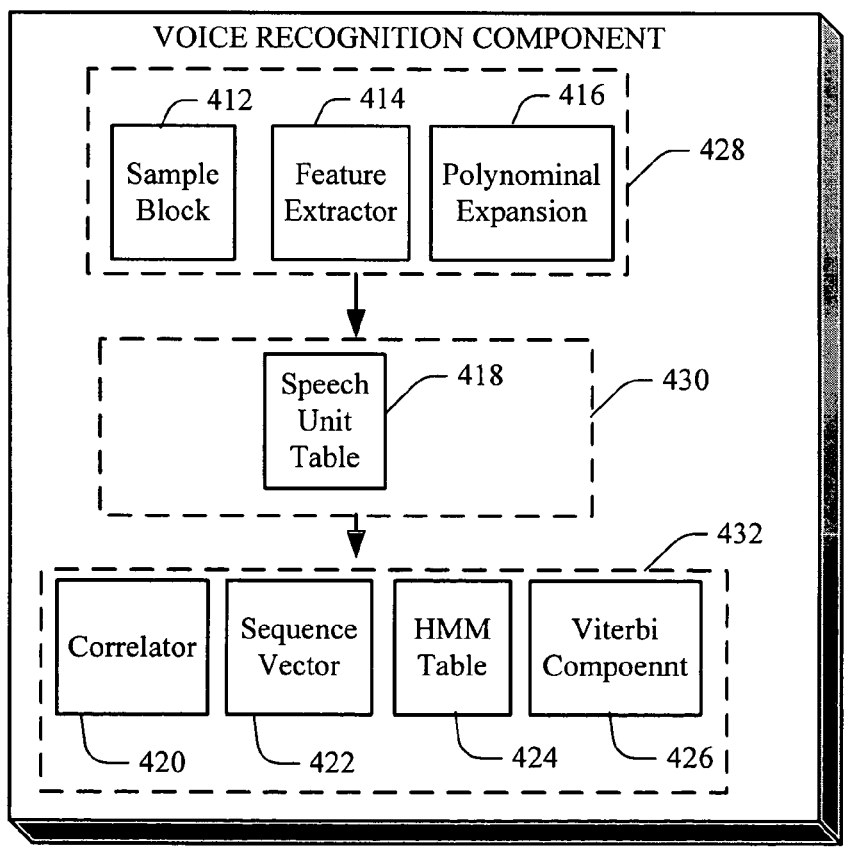
FIG. 4 illustrates a particular voice recognition system that is implemented as part of the hand held computing unit in accordance with an aspect of the subject innovation.

FIG. 4 illustrates a particular voice recognition system 410 that is implemented as part of the hand held computing unit in accordance with an aspect of the subject innovation. Such speech recognition system 410 can consist of three basic sections. The first section is an extraction section 428 that has an input for receiving an input speech, a sequence of speech sounds, or a signal into a speech sampler component 412. The input speech can be selected from a large uniform database of speech with a wide range of words, speakers and accents, or as determined for specific applications of the mobile computing unit for rapid deployment. The output data of sampler component 412 can be transferred to a feature extractor component 414 that can extract time domain and spectral domain parameters from the spoken input speech into a feature vector. Such feature vectors typically consist of cepstral, delta cepstral, linear prediction coefficients, energy and magnitudes, and the like. The feature vectors from feature extractor component 414 can be expanded by a polynomial expansion component 416 into high order polynomials, typically a $4^{th}$ order polynomial.

The second section is a building block section 430 having a speech unit table 418 that creates a set of speech building blocks. Such speech building blocks can be employed to construct any word in a spoken language. The third section is an HMM section 432 that performs a Hidden Markov Model statistical analysis of the feature vector sequence that can be employed for selection of the spoken word. HMM section 432 can further include a correlator component 420 that correlates each vector in the current word derived from the speech input received by sampler component 412 with every speech segment vector stored in speech unit table 418. Thus, correlator component 420 compares the expanded $4^{th}$ order polynomials from polynomial expansion component 416 against the $4^{th}$ order polynomial representation speech segments received from speech unit table 418. A best match is determined for each input speech and the results of the comparison are passed to a sequence vector component 422. It is to be appreciated that other order polynomials can also be compared by the correlator component 420.

For a particular HMM, the Viterbi algorithm can be employed to find the most probable sequence of hidden states given a sequence of observed states. A Viterbi component 426 receives inputs from sequence vector 422 and HMM table 424. HMM table 424 can consist of three matrices for each word in the vocabulary, e.g. Initial State, State Transition, and Observation Probability Density Distribution. The Initial State matrix is a list of probabilities for starting in each of the possible states. The State Transition matrix lists the probabilities of transitioning from any given state to all possible states. The Observation Probability Density Distribution matrix lists the probabilities of any given speech unit being observed from any given state. Viterbi component 426 can provide an output that represents the single best state sequence or path to maximize the probability of having reached the desired state.

Figure 5:
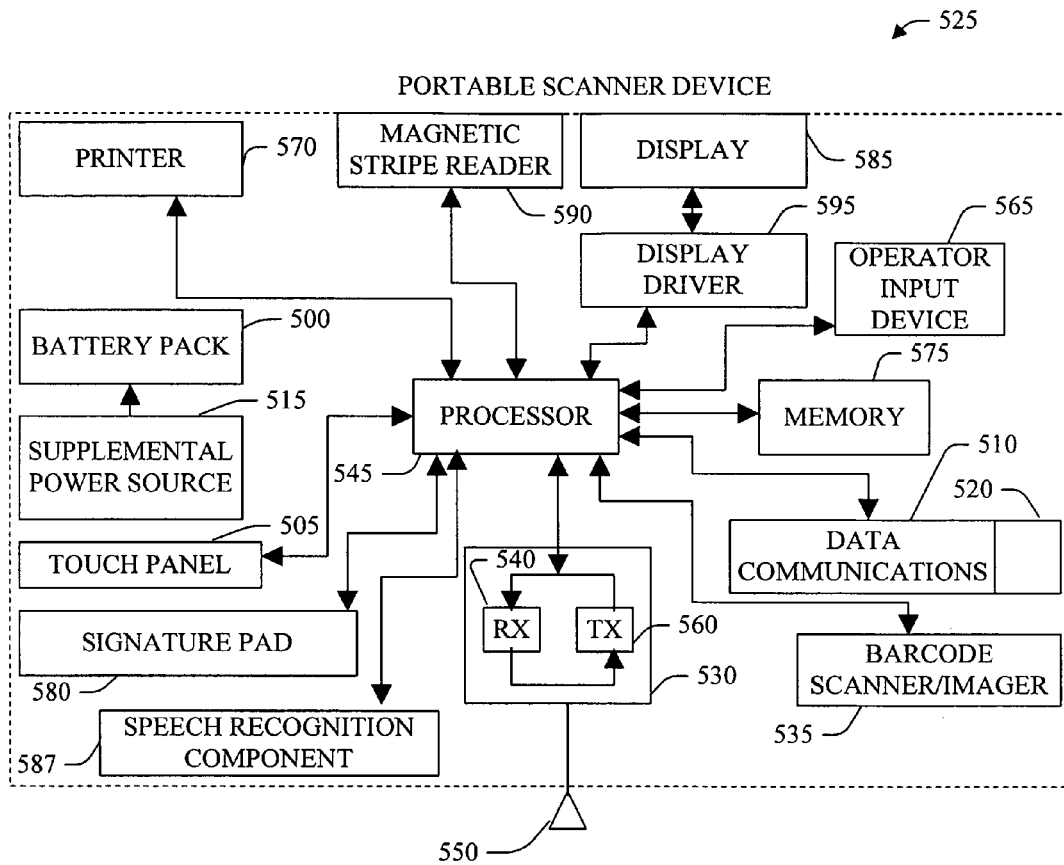
FIG. 5 illustrates a particular block diagram of a mobile computing unit with voice recognition capabilities in accordance with an aspect of the subject innovation.

FIG. 5 illustrates a particular block diagram of a mobile computing unit with speech recognition capabilities as described supra. As illustrated, a processor 545 is responsible for controlling the general operation of a portable scanner device 525 that employs a voice/speech recognition component 587 as discussed supra. The processor 545 is programmed to control and operate the various components within the scanner device 525 in order to carry out the various functions described herein. The processor or CPU 545 can be any of a plurality of processors, such as the p24T, Pentium 50/75, Pentium 60/90, and Pentium 66/100, Pentium PRO and Pentium 2, and other similar and compatible processors or micro controllers. A processor such as Intel's 8 bit microcontrollers, the 8031, 8051 or 8052, ARM (Acorn RISC Machine), MIPS (Microprocessor without interlocked pipeline stages), multi media application processors, and the like, can also be employed. The manner the processor 545 can be programmed to carry out the functions relating to the operations of the scanner device will be readily apparent to those having ordinary skill in the art based on the description provided herein. A memory 575 tied to the processor 545 is also included in the portable scanner device 525 and serves to store program code executed by the processor 545 for carrying out operating functions of the scanner. The memory 575 also serves as a storage medium for temporarily storing information such as receipt transaction information and the like. The memory 575 is adapted to store a complete set of the information to be displayed. According to one particular aspect, the memory 575 has sufficient capacity to store multiple sets of information, and the processor 545 could include a program for alternating or cycling between various sets of display information.

Display(s) 585 is coupled to the processor 545 via a display driver system 595. The display 585 is operable to display data or other information relating to ordinary operation of the portable scanner 525. For example, the display 585 may display a set of customer information, which is displayed to the operator and may be transmitted over a system backbone (not shown). Additionally, the display 585 may display a variety of functions that control the execution of the portable electronic device 525. The display 585 is capable of displaying both alphanumeric and graphical characters. Furthermore, as explained earlier the display 585 may be a touch screen that is capable of receiving user information as well as displaying information.

Power is provided to the processor 545 and other components forming the portable electronic device 525 by a battery pack 500, which is located in the top housing. In the event that the battery pack 500 fails or becomes disconnected from the portable electronic device 525, a supplemental power source 515 provides power to the processor 545, the supplemental power source 515 being a super capacitor connected electrically in parallel with the battery 500. The hand-held terminal 525 may enter a minimum current draw of sleep mode upon detection of a battery failure.

The portable electronic device 525 includes a communication subsystem 530 that includes a data communication port employed to interface the processor 545 with the main computer. The portable electronic device 525 also optionally includes an RF section 530 connected to the processor 545. The RF section 530 includes an RF receiver 540, which receives RF transmissions from the main computer for example via an antenna 550 and demodulates the signal to obtain digital information modulated therein. The RF section 530 also includes an RF transmitter 560 for transmitting information to the main computer, for example, in response to an operator input, or the completion of a transaction. Peripheral devices, such as a printer 570, signature pad 580, magnetic stripe reader 590, touch panel 505, can also be coupled to the portable scanner device 525 through the processor 545.

Figure 6:
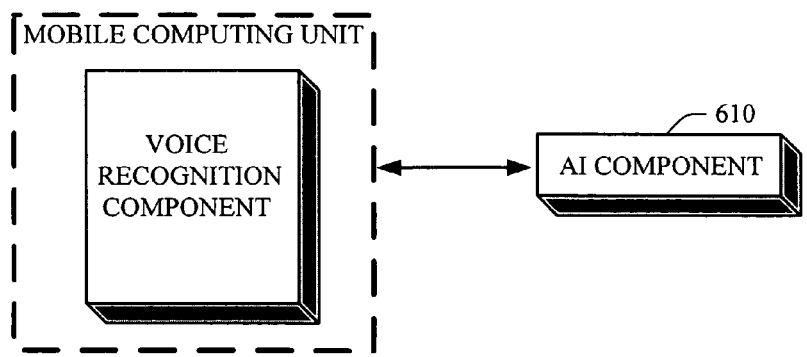
FIG. 6 illustrates a mobile computing unit that employs an Artificial Intelligence (AI) component, in accordance with an aspect of the subject innovation.

The subject innovation (e.g., in connection with determining a configuration and connection to a network) can employ various artificial intelligence based schemes for carrying out various aspects thereof. FIG. 6 illustrates a mobile computing unit that employs an Artificial Intelligence (AI) component 610. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

For example, a process for speech recognition and/or network connection can be facilitated via an automatic classification system and process. Such classification can employ a probabilistic and/or statistical-based analysis (e.g., factoring into the analysis utilities and costs) to prognose or infer an action that is desired to be automatically performed. For example, a support vector machine (SVM) classifier can be employed. A classifier is a function that maps an input attribute vector, $x=(x1, x2, x3, x4, xn)$, to a confidence that the input belongs to a class—that is, f(x)=confidence(class). Other classification approaches include Bayesian networks, decision trees, and probabilistic classification models providing different patterns of independence can be employed. Classification as used herein also is inclusive of statistical regression that is utilized to develop models of priority. As will be readily appreciated from the subject specification, the subject innovation can employ classifiers that are explicitly trained (e.g., via a generic training data) as well as implicitly trained (e.g., via observing system behavior, receiving extrinsic information) so that the classifier(s) is used to automatically determine according to a selected criteria which regions to choose. For example, with respect to SVM's it is to be appreciated that other classifier models may also be utilized such as Naive Bayes, Bayes Net, decision tree and other learning models—SVM's are configured via a learning or training phase within a classifier constructor and feature selection module.

Figure 7:
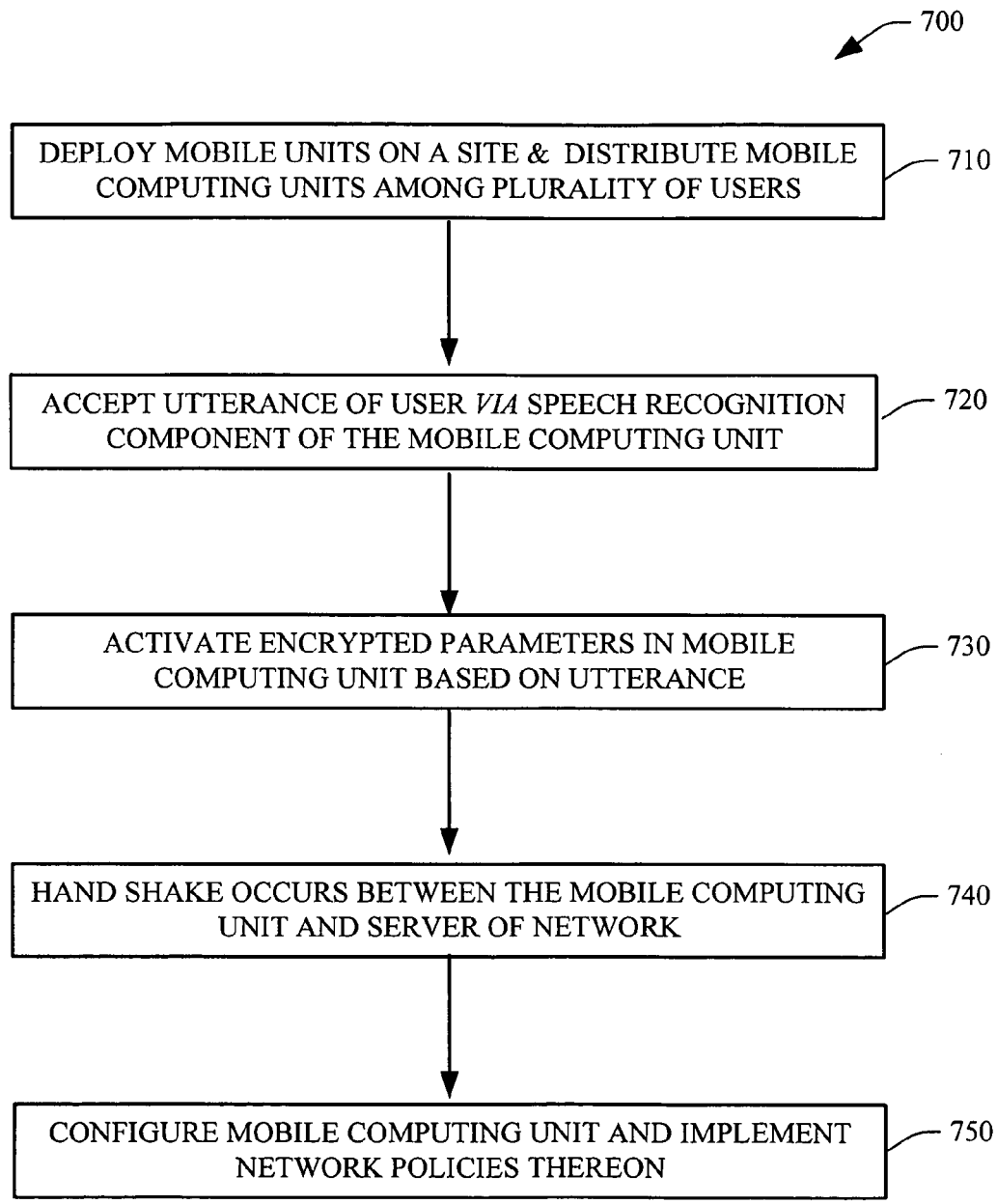
FIG. 7 illustrates an exemplary methodology of connecting a mobile computing unit to a network via voice utterance in accordance with an aspect of the subject innovation.

FIG. 7 illustrates an exemplary methodology 700 of connecting a mobile computing unit to a network via voice utterance in accordance to an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 710, a deployment of mobile units occur at a site, and such mobile units are distributed among a plurality of users. Each user then can then utter a predetermined voice or sequence of words, which can be inputted into the mobile computing unit and accepted by the voice recognition component at 720, to facilitate establishing a connection with the network. Accordingly, encrypted parameters implemented in a configuration of the mobile computing unit can be activated in response to a user uttering a sequence of words at 730. At 740, a hand shake can take place between the mobile device(s) and the server(s) associated with the network. The server(s) associated with the network can then send down all settings (e.g., at once) to the mobile computing unit(s), to configure the device at 750. Such policy delivery and enforcement logic can verify proper installation of server policies in a timely manner, and non-compliant devices that do not provide proper voice activated codes are denied service from the server.

Figure 8:
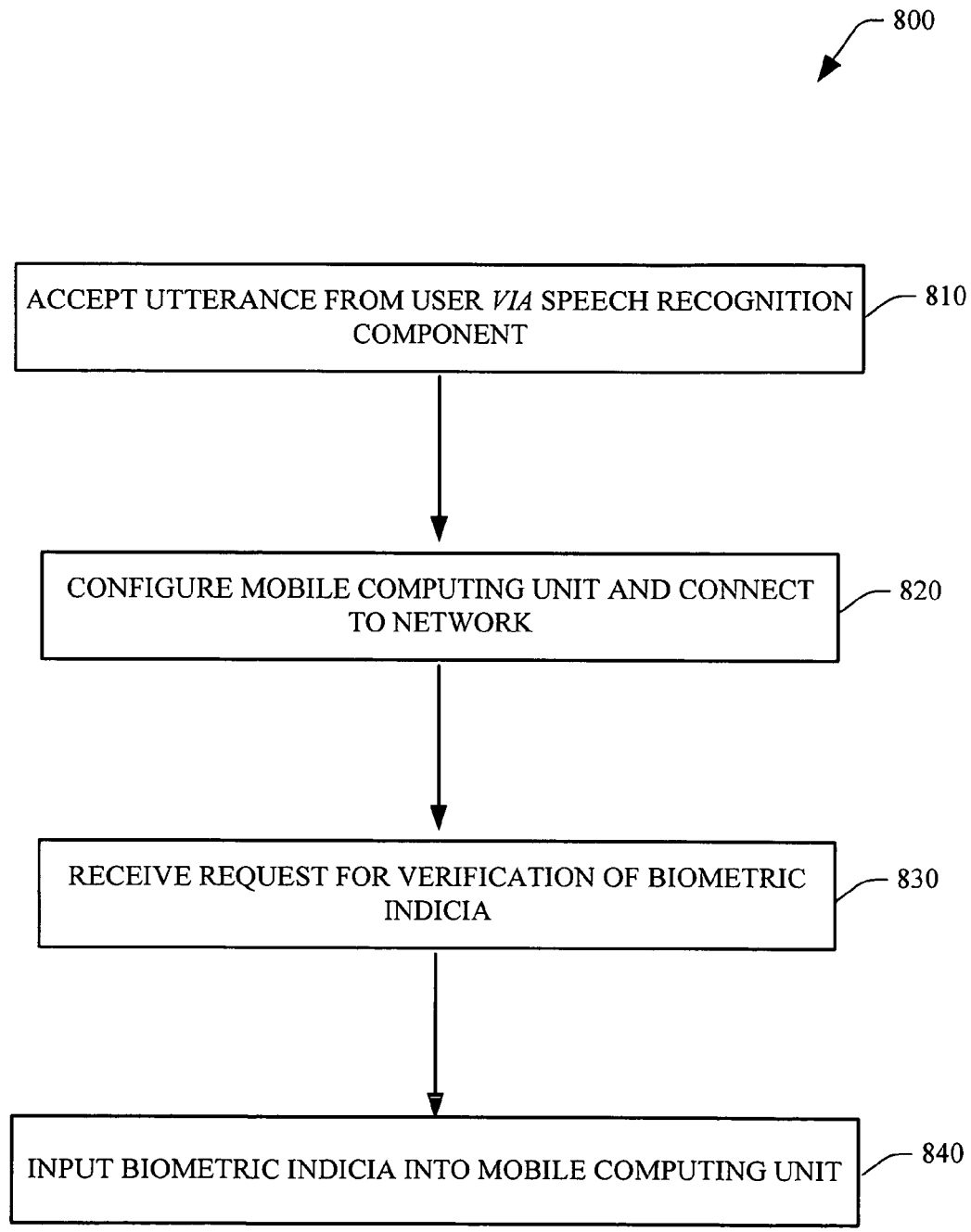
FIG. 8 illustrates a further methodology of verifying a user's identity to permit additional access to such user, upon the connection of the user to the network.

FIG. 8 illustrates a further methodology 800 of verifying a user's identity to permit additional access to such user, upon the connection of the user to the network. Initially, and at 810 the mobile computing unit accepts a voice from a user. Next, and at 820 the mobile computing unit is connected to a network via employing a speech recognition component associated with the mobile computing unit. Subsequently, and at 830 a request for verification of biometric indicia of the user is sent to the mobile computing unit. Such biometric indicia can for example include, retina scan, fingerprint, and the like. At 840, such biometric indicia can be inputted in to the computing mobile terminal for transmittal to a central computer associated with the network. Upon verification of such indicia, the mobile computing unit can be granted additional access to services provided by the network. As such, a secure mechanism can be provided for a quick deployment of a plurality of mobile computing units onto the network.

Figure 9:
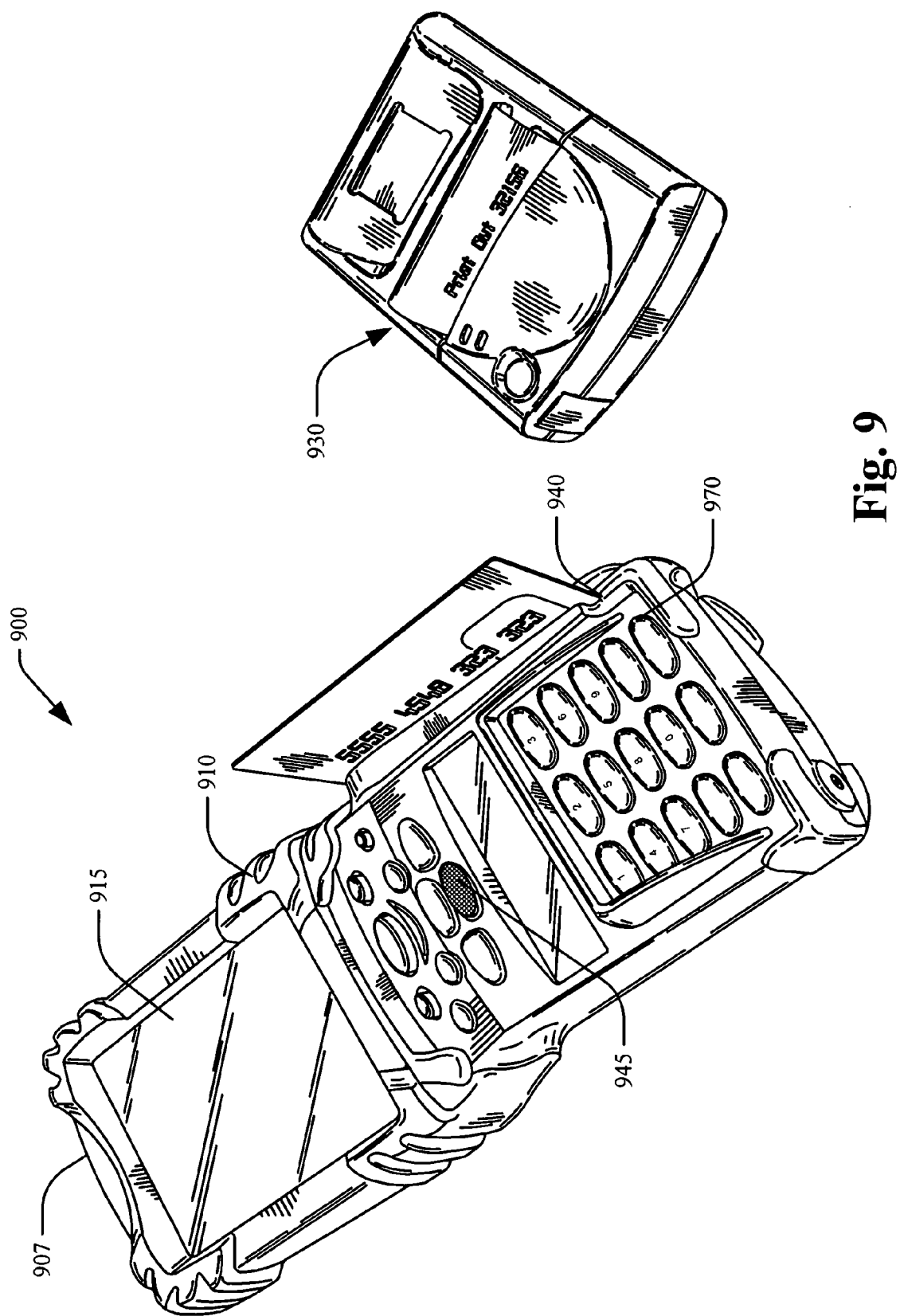
FIG. 9 illustrates a mobile computing unit with a voice recognition component in accordance with an aspect of the subject innovation.

FIG. 9 illustrates a mobile computing unit with a voice recognition component in accordance with an aspect of the subject innovation. The user can utter a voice in the microphone 945 to initiate connection of the handheld terminal 900 to a network. The handheld terminal 900 includes a housing 910 which can be constructed from a high strength plastic, metal, or any other suitable material. The portable terminal 900 can also include a display 915 functions to display data or other information relating to ordinary operation of the handheld terminal 900 and/or mobile companion 930.

Additionally, the display 915 may display a variety of functions that are executable by the handheld terminal 900 and/or one or more mobile companion(s) 930. The display 915 can provide for a touch screen interface that can employ capacitive, resistive touch, infrared, surface acoustic wave, or grounded acoustic wave technology.

The handheld terminal 900 can also include a magnetic strip reader 940 or other data capture mechanism. The handheld terminal 900 can also include a window 907 in which a bar code reader/bar coding imager is able to read a bar code label, or the like, presented to the handheld terminal 900. The handheld terminal 900 can include a LED (not shown) that is illuminated to reflect whether the bar code has been properly or improperly read. Alternatively, or additionally, a sound may be emitted from a speaker (not shown) to alert the user that the bar code has been successfully imaged and decoded. The handheld terminal 900 also includes an antenna (not shown) for wireless communication with an RF access point; and an IR transceiver (not shown) for communication with an IR access point.

The keypad 970 can include a top cover and a bottom cover that can be over molded around a common boundary. The top cover and the bottom cover can sandwich a plurality of associated keypad components (e.g., flex members, electro luminous panel, a silicone membrane with a plurality of keys thereupon printed circuit boards, LEDs, and the like). The common boundary can be formed by a surface area and/or line perimeter common to the top cover and the bottom cover, (e.g. a contact surface between top and bottom cover, a surface encapsulating the keypad components, edges of the stacked components and the like.) Typically, materials employed for fabricating the back cover with the depression can include various types of polycarbonates, thermoset plastics, thermoformed plastic, and typically material that are capable of being molded to provide a suitable depression/groove for accepting a user's finger as described in detail supra.

Figure 10:
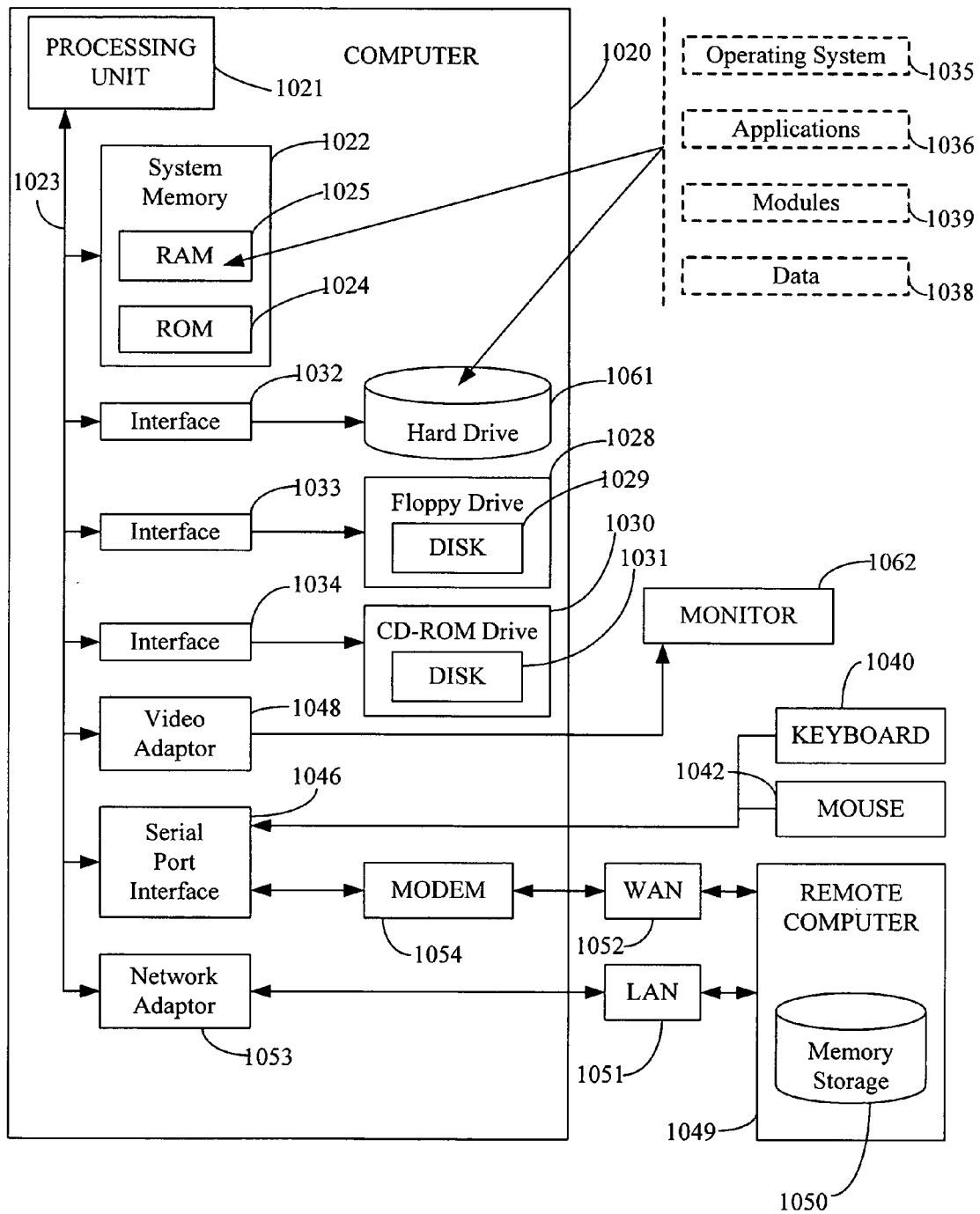
FIG. 10 illustrates a brief, general description of a suitable computing environment, which can be part of the central host unit and/or mobile computing unit, in accordance with an aspect of the subject innovation.

Referring now to FIG. 10, a brief, general description of a suitable computing environment, which can be part of the central host unit, or the computing environment of mobile computing unit, is illustrated wherein the various aspects of the subject innovation can be implemented. While the innovation has been described above in the general context of computer-executable instructions of a computer program that runs on a computer and/or computers, those skilled in the art will recognize that the innovation can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the innovation can also be practiced in distributed computing environments where tasks are performed by remote processing devices that are linked through a communications network. However, some, if not all aspects of the innovation can be practiced on stand-alone computers. In a distributed computing environment, program modules can be located in both local and remote memory storage devices. The exemplary environment includes a mobile computing unit/computer 1020, including a processing unit 1021, a system memory 1022, and a system bus 1023 that couples various system components including the system memory to the processing unit 1021. The processing unit 1021 can be any of various commercially available processors. Dual microprocessors and other multi-processor architectures also can be used as the processing unit 1021.

The system bus can be any of several types of bus structure including a memory bus or memory controller, a peripheral bus, and a local bus using any of a variety of commercially available bus architectures. The system memory may include read only memory (ROM) 1024 and random access memory (RAM) 1025. A basic input/output system (BIOS)—and/or a Hardware Abstraction Layer (HAL) that functions as an abstraction layer between the physical hardware of a computer and the software that runs on that computer—containing the basic routines that help to transfer information between elements within the computer 1020, such as during start-up, is stored in ROM 1024.

The computer 1020 further includes a hard disk drive 1029, a magnetic disk drive 1028, e.g., to read from or write to a removable disk 1029, and an optical disk drive 1030, e.g., for reading from or writing to a CD-ROM disk 1031 or to read from or write to other optical media. The hard disk drive 1029, magnetic disk drive 1028, and optical disk drive 1030 are connected to the system bus 1023 by a hard disk drive interface 1032, a magnetic disk drive interface 1033, and an optical drive interface 1034, respectively. The drives and their associated computer-readable media provide nonvolatile storage of data, data structures, computer-executable instructions, etc. for the computer 1020. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject innovation.

A number of program modules can be stored in the drives and RAM 1025, including an operating system 1035, one or more application programs 1036, other program modules 1039, and program data 1038. The operating system 1035 in the illustrated computer can be substantially any commercially available operating system.

A user can enter commands and information into the computer 1020 through a keyboard 1040 and a pointing device, such as a mouse 1042. Other input devices (not shown) can include a microphone, a joystick, a game pad, a satellite dish, a scanner, or the like. These and other input devices are often connected to the processing unit 1021 through a serial port interface 1046 that is coupled to the system bus, but may be connected by other interfaces, such as a parallel port, a game port or a universal serial bus (USB). A monitor 1049 or other type of display device is also connected to the system bus 1023 via an interface, such as a video adapter 1048. In addition to the monitor, computers typically include other peripheral output devices (not shown), such as speakers and printers.

The computer 1020 can operate in a networked environment using logical connections to one or more remote computers, such as a remote computer 1049. The remote computer 1049 may be a workstation, a server computer, a router, a peer device or other common network node, and typically includes many or all of the elements described relative to the computer 1020, although only a memory storage device 1050 is illustrated in FIG. 10. The logical connections depicted in FIG. 10 may include a local area network (LAN) 1051 and a wide area network (WAN) 1052. Such networking environments are commonplace in offices, enterprise-wide computer networks, Intranets and the Internet.

When employed in a LAN networking environment, the computer 1020 can be connected to the local network 1051 through a network interface or adapter 1053. When utilized in a WAN networking environment, the computer 1020 generally can include a modem 1054, and/or is connected to a communications server on the LAN, and/or has other means for establishing communications over the wide area network 1052, such as the Internet. The modem 1054, which can be internal or external, can be connected to the system bus 1023 via the serial port interface 1046. In a networked environment, program modules depicted relative to the computer 1020, or portions thereof, can be stored in the remote memory storage device. It will be appreciated that the network connections shown are exemplary and other means of establishing a communications link between the computers can be employed.

In accordance with the practices of persons skilled in the art of computer programming, the subject innovation has been described with reference to acts and symbolic representations of operations that are performed by a computer, such as the computer 1020, unless otherwise indicated. Such acts and operations are sometimes referred to as being computer-executed. It will be appreciated that the acts and symbolically represented operations include the manipulation by the processing unit 1021 of electrical signals representing data bits which causes a resulting transformation or reduction of the electrical signal representation, and the maintenance of data bits at memory locations in the memory system (including the system memory 1022, hard drive 1029, floppy disks 1028, and CD-ROM 1031) to thereby reconfigure or otherwise alter the computer system's operation, as well as other processing of signals. The memory locations wherein such data bits are maintained are physical locations that have particular electrical, magnetic, or optical properties corresponding to the data bits.

Figure 11:
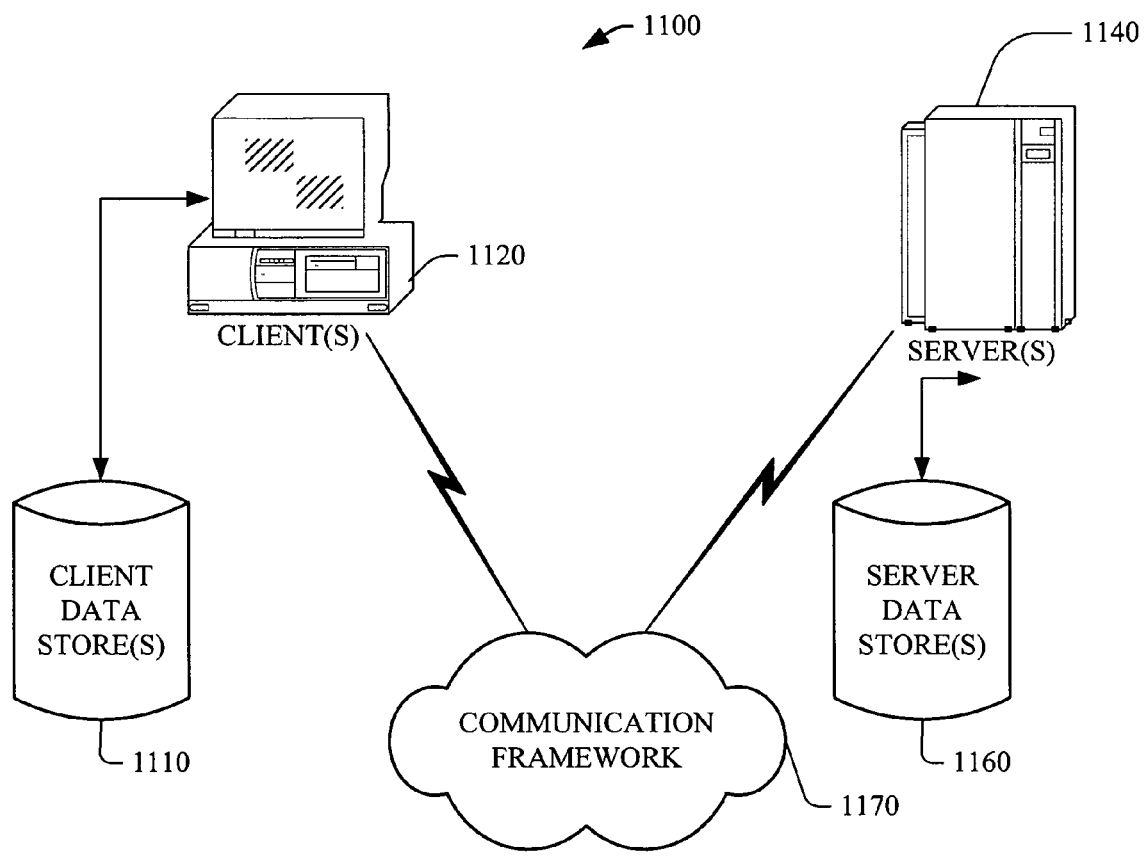
FIG. 11 illustrates a central host—server system in accordance with an aspect of the subject innovation.

Referring now to FIG. 11, a central host-server system 1100 (e.g., associated with a network for deployment of mobile computing unit), which can employ various aspects of the subject innovation is illustrated. The central host 1120 can employ hardware and/or software (e.g., threads, processes, computing devices). The system 1100 also includes one or more server(s) 1140. The server(s) 1140 can also be hardware and/or software (e.g., threads, processes, computing devices) associated with for example operations and/or location and identification of construction units. For example, such servers 1140 can house threads to perform transformations by employing the subject innovation. The central host 1120 and the server 1140 can communicate, in the form of data packets transmitted according to the subject innovation, between two or more computer processes. The central host/server can also share the same process. As illustrated, the system 1100 includes a communication framework 1170 that can facilitate communications between the central host 1120 and the server(s) 1140. The central host 1120 is operationally connected to one or more data store(s) 1110 that can store information local to the host unit 1120. Moreover, the host 1120 can access and update databases 1160 located on a server computer 1140 running a server process. In one aspect of the subject innovation, the communication frame work 1170 can be the internet, with the client process being a Web browser and the server process being a Web server. As such, a typical host 1120 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 1140 can be any computer, mainframe computers, or dedicated workstations, which can be with operation and control of the construction equipment.

Although the innovation has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation.

In addition, while a particular feature of the innovation may have been disclosed with respect to only one of several implementations, such feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising".

What is claimed is:

1. A mobile computing unit comprising:
  a speech recognition component that recognizes a user's utterance for connection of the mobile computing unit to a network and sends a query to the network in response to the user's utterance; and
  a configuration component that selects an appropriate network configuration from a set of network configurations previously stored on the unit and automatically configures the mobile computing unit to operate on the network based on the selected network configuration, the selection of network configuration is based at least in part upon recognition of the user's utterance by the voice recognition component and a response containing network access information sent by the network in reply to the query.

2. The mobile computing unit of claim 1, the configuration component is a network interface card.

3. The mobile computing unit of claim 1, the speech recognition component further comprises a feature analysis component that provides observation vectors used for training Hidden Markov Models (HMMs) that characterize various speech sounds.

4. The mobile computing unit of claim 1, the speech recognition component further comprises a unit-matching component that provides a likelihood of a match of all sequences of speech recognition units to an input speech sound.

5. The mobile computing unit of claim 4, the speech recognition component further comprises a lexical decoding that places constraints on the unit-matching component, so that paths investigated are those corresponding to sequences of speech sounds that are in a predetermined word listing.

6. The mobile computing unit of claim 4, the speech recognition component further comprises a syntactic and semantic analysis component to constrain paths investigated.

7. The mobile computing unit of claim 1, the speech recognition component further comprises an extraction component, a speech unit table, and an HMM component.

8. The mobile computing unit of claim 7, the extraction component has an input component for receiving an input speech into a speech sampler component.

9. The mobile computing unit of claim 7, the speech unit table creates a set of speech building blocks.

10. The mobile computing unit of claim 1, further comprising an artificial intelligence component.

11. The mobile computing unit of claim 1, wherein the response is sent to a multicast address.

12. A method of connecting a mobile computing unit to a network comprising:
  storing a set of disparate network configurations on the mobile computing unit;
  receiving a voice input by a voice recognition component of the mobile computing unit;
  sending a query from the mobile computing unit to the network in response to receiving the voice input;
  receiving a response at the mobile computing unit from the network in response to the query, the response comprising network access information;
  selecting the appropriate network configuration from the stored set of disparate network configurations based on the response from the network and the voice input;
  configuring the mobile computing unit with the network configuration based on the response from the network; and
  connecting the mobile computing unit to the network based in part on the voice input.

13. The method of claim 12 further comprising activating encrypted parameters implemented in a configuration of the mobile computing unit in response to a user uttering a sequence of words.

14. The method of claim 13 further comprising receiving request for verification of biometric indicia by the mobile computing unit.

15. The method of claim 14 further comprising accepting biometric indicia by the mobile computing unit from the user.

16. The method of claim 15 further comprising transmitting the biometric indicia to a central computer of the network.

17. The method of claim 16 further comprising accepting a grant of additional access to the network by the mobile computing unit upon verification of the transmitted biometric indicia by the network.

18. The method of claim 16 further comprising employing HMM in conjunction with speech recognition by the mobile computing unit.

19. The method of claim 12 further comprising initiating a hand shake between the mobile computing unit and the server(s) associated with the network.

20. The method of claim 12 further comprising receiving settings from servers of the network by the mobile computing unit.

21. The method of claim 12, further comprising transmitting the response to a multicast address.

22. A mobile computing unit comprising:
- means for storing a set of disparate network configurations on the mobile computing unit;
- means for recognizing a user's voice utterance; means for querying a network in response to the user's voice utterance;
- means for receiving a response from the network in response to the query, the response including network access information;
- means for selecting the appropriate network configuration from the stored set of disparate network configurations based on the response from the network; and
- means for configuring the mobile computing unit for connection to the network based on the selected network configuration and the user's voice utterance.

* * * * *